Aug. 3, 1948.        R. C. RUSSELL        2,446,393
SCREW THREADED MECHANICAL MOVEMENT
Filed June 14, 1945        3 Sheets-Sheet 3

INVENTOR.
Robert C. Russell.
BY
Harness, Dickey & Pierce
ATTORNEYS.

Patented Aug. 3, 1948

2,446,393

UNITED STATES PATENT OFFICE 2,446,393

SCREW-THREADED MECHANICAL MOVEMENT

Robert C. Russell, Cleveland Heights, Ohio, assignor to Eaton Manufacturing Company, Detroit, Mich., a corporation of Ohio Application June 14, 1945, Serial No. 599,417

10 Claims. (Cl. 192—.02)

This invention relates to mechanical movements and particularly to that type thereof commonly known as a nut and screw, the principal object being the provision of a mechanical movement of this type of improved construction and operating characteristics.

Objects of the invention include the provision of a mechanical movement comprising a nut and a screw operatively interconnected with one another by means of balls, whereby to reduce the friction loss between the screw and nut under load, together with means for limiting relative movement between the nut and the screw longitudinally of the screw without restricting rotation therebetween; the provision of a nut and screw construction including balls for transmitting a force therebetween and in which it is possible to employ a relatively small number of balls without restricting the relative longitudinal movement between the screw and the nut; the provision of a construction as above described in which the screw is provided with a helical thread thereon, the nut is provided with circumferentially directed grooves therein, and balls are received between the grooves in the nut and the grooves formed between the threads of the screw; the provision of a construction as above described including a cage interposed between the nut and the screw serving to maintain a plurality of balls when employed in proper operative relation with respect to the grooves between the threads of the screws; the provision of a construction as above described including means for limiting the movement of the balls axially of the screw; and the provision of a nut and screw construction of the type described so constructed and arranged that it is impossible to jam one with respect to the other because of attempted relative movement of the nut with respect to the screw beyond a desired point in the length of the screw.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and suitable applications thereof.

Screw and nut assemblies are commonly employed as a mechanical movement for effecting translation of some desired device or part the movement of which requires a multiplication of the force available or provided. While conventional nut and screw constructions are widely used for this purpose, and particularly screws and nuts having interfitting square threads, where the forces to be transmitted are relatively high the friction losses resulting in conventional screw and nut constructions are so high as to result in a loss of the major proportion of the applied force. This will be appreciated when it is understood that the mechanical efficiency of a comparative conventional nut and screw having square threads is approximately 30%.

It has heretofore been proposed to provide screw and nut constructions in which balls are interposed between the threads of the screw and nut so that the force transmitted between the two is through the balls which roll on both the screw and nut and thereby materially reduce the friction losses occurring in conventional screw and nut constructions. Such constructions as previously suggested have, however, had certain inherent disadvantages. One of these disadvantages is that in some of these suggested constructions an undue number of balls is required, rendering the construction unduly expensive, and in all of them, as far as I am aware, if the axially movable member overruns its intended limiting position the balls will be jammed between the nut and the screw, in many cases locking the nut to the screw and in any event having deleterious effects on the nut and screw or on the operating mechanism therefor.

The nut and screw construction of the present invention is of the type last described, that is balls are provided between the nut and the screw so as to reduce the friction loss present in conventional nut and screw constructions and thereby increase the mechanical efficiency thereof. Additionally, the device of the present invention is so constructed and arranged as to employ a minimum number of balls, thereby rendering it economical to build, and is so constructed and arranged as to positively preclude the possibility of jamming the balls between the screw and the nut. In accordance with the present invention the relative rotation between the screw and the nut may continue after the movable part has reached its limiting position in either one or both directions of movement without causing jamming of the balls between the screw and the nut, thus rendering the screw and the nut relatively freely rotatable with respect to each other under such conditions. It will be appreciated that the present invention is applicable to a great variety of uses, those shown in the accompanying drawing by way of illustration simply being indicative of a limited number of applications to which the operating characteristics of the invention are particularly advantageous.

Figure 1:
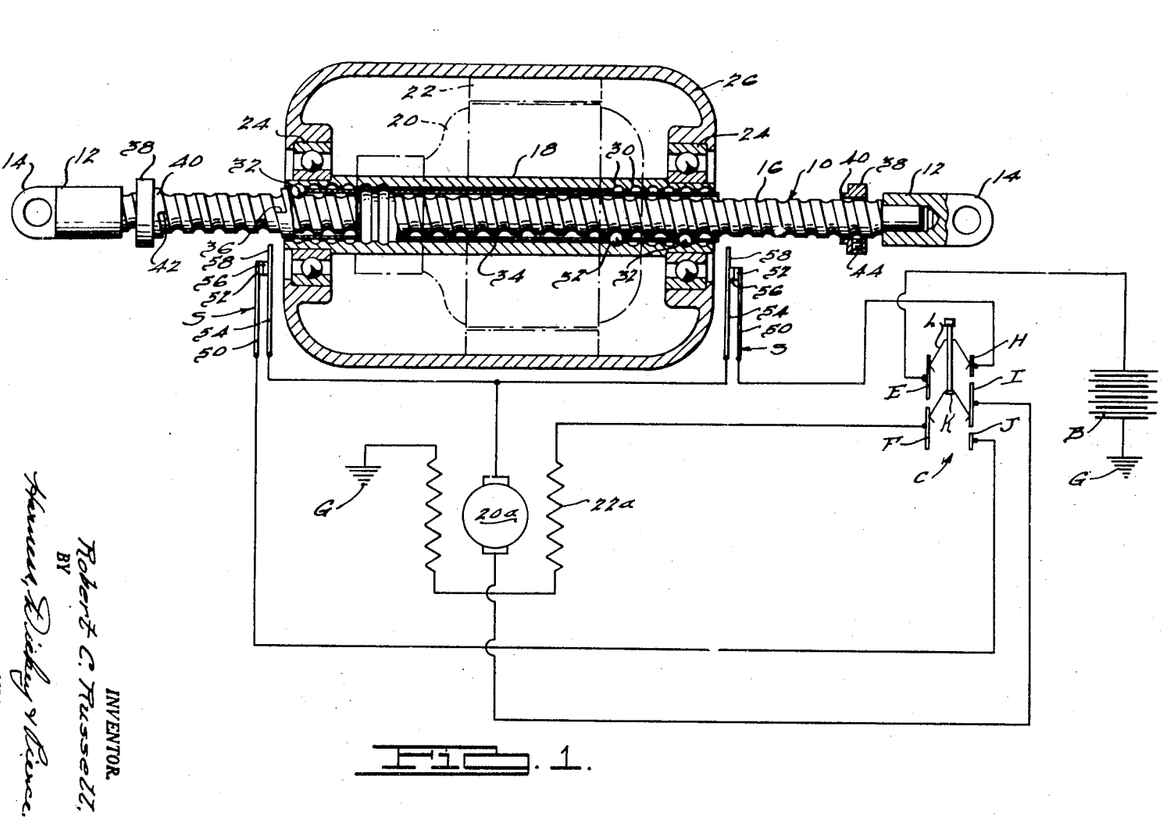
Fig. 1 is a sectional view taken diametrically through a form of the device of the present invention wherein the nut is rotated by a reversible electric motor and is held against axial movement, and showing the wiring diagram for the circuit controlling the electric motor.

Referring now to Fig. 1, the application of the present invention is shown in connection with a construction in which the nut is rotatable and held against axial movement, the screw being axially movable but held against rotation. The screw, which is indicated generally at 10, is of elongated character and is provided at each end with a connecting member 12 each of which outwardly terminate in a flat eye portion 14 adapting it for connection to a clevis or the like and which, in operation, will maintain the screw 10 against rotation. The screw 10 is provided with a helical thread thereon formed by helically grooving the screw 10 as at 16, the groove 16 being of partially circular cross-sectional conformation and, of course, of constant pitch throughout the length of the screw.

The nut 18 in this particular case also constitutes the drive shaft of an electric motor including an armature 20 and a field structure 22. The opposite ends of the nut 18 are rotatably supported in bearing assemblies 24 mounted in a housing 26 surrounding the armature 20 and field structure 22 and in which the field structure 22 is suitably or conventionally fixed as by means of a press fit or the like. The opposite ends of the nut 18 are slightly reduced in diameter to form a shoulder abutting the inner race of the corresponding bearing 24 and by means of which the nut 18 is held against axial movement in the housing 26.

The nut 18 is provided in its bore with a plurality of axially spaced, and preferably equally axially spaced, circumferential grooves 30, such grooves 30 being of the same cross-sectional configuration as the grooves 16 in the screw 10. One ball 32 is preferably interposed between each groove 30 and the grooves 16. While one ball 32 may serve as the sole connection between the screw and the nut it will be appreciated that the proportion of the entire load to be carried by a ball 32 is dependent upon the number of balls employed and, therefore, it will ordinarily be desirable to employ a plurality of balls to thereby proportionally reduce the load which each ball is required to carry. Where more than one ball is employed as shown and as is preferable, then a cage such as 34 and which may comprise a relatively thin walled metal tube is shown. The cage 34 is arranged in surrounding relationship with respect to the screw 10 and between the screw 10 and the nut 18, and at the proper location for each ball 32 it is provided with an opening in which such ball is relatively closely but freely rotatably received and through which opening such ball projects both radially inwardly and radially outwardly of the wall of the cage. The cage 34 thus acts to maintain the various balls 32 in their proper relationship with respect to each other about the axis of the screw 10. It is to be particularly noted that in this construction, and unlike some suggested constructions employing balls between a nut and a screw, during relative rotation of the nut and the screw the balls do not tend to travel axially of the nut but are maintained at the same axial position with respect thereto regardless of the position of the screw.

It will be understood by those skilled in the art that as long as the angle or pitch of the groove 16 does not exceed the angle of friction between the balls and the screw and the nut the drive is positive and no slipping will occur under load. Where these parts are formed from steel, then the maximum pitch angle of the grooves 16 of the screw is approximately 11 degrees if slippage is to be precluded under all circumstances.

On the other hand it will be also understood that relative movement between the screw and the nut does not produce an axial movement of the screw equivalent to the pitch of the groove 16 of the screw. For instance, with a screw having seven threads per inch of length it requires approximately twelve turns of the nut relative to the screw to effect a relative axial movement of one inch between them. Thus the structure has a greater mechanical advantage than a conventional type of screw and nut construction having the same number of threads per inch.

It is particularly important to note that in a screw and nut construction of the type shown and described, where the parts are made from hardened steel and brought to a desirably high state of finish the efficiency of the construction is approximately 98%, this compared to an efficiency of a conventional nut in the screw construction having square threads of approximately 30%. The advantages of the construction in this respect will thus be appreciated inasmuch as it is thus possible to employ a driving motor or the like of approximately only one-third the horsepower than would be required with a conventional nut and screw to move the same load.

The great increase in efficiency of the construction shown and described over that of a conventional nut and screw is only one of the advantages of the device of the present invention. Another advantage arises from the fact that if any time the balls are prevented from further travel in the grooves 16 without restricting their movement in the grooves 30, no possible jamming of the balls can occur and relative free rotation of the nut with respect to the screw may continue without any relative axial displacement between them. Thus if at any point in the relative axial position of the nut and screw the balls 32 are stopped from further movement in the grooves 16 the nut 18 may continue to rotate without effecting longitudinal displacement of the screw 10.

Any suitable means may be provided for stopping movement of the balls 32 in the grooves 16 of the screw 10 at a desired relative axial position between the nut and the screw. Inasmuch as the cage 34 controls the position of all of the balls 32 it will be appreciated that if the cage is locked against rotation with respect to the screw

10 at any relative position of the nut and screw the balls 10 will be stopped from further movement in the grooves 16 and under such conditions if relative rotation between the nut and screw is continued the balls will simply move around in their grooves 30. In the construction illustrated in Fig. 1 the opposite ends of the cage 34 are formed on a helix corresponding with the helix of the grooves 16 for one complete revolution and the opposite ends of such helix are connected together by an axially directed wall 36 forming a stop face. A collar 38 is mounted upon each end of the screw 10 inwardly of the corresponding member 14. Each collar 38 is provided with an axial extension 40 directed inwardly toward the nut 18 and the free end face of each extension 40 is also formed on a helix corresponding with the helix of the groove 16 of the screw 10 for one complete revolution and the opposite ends of such helix are connected together by an axially directed stop surface 42. In this last respect it will be noted that stop surfaces 36 and 42 are shown only at the lefthand end of the screw 10 in Fig. 1 where the cage 34 and collar 38 at such end are shown at least in part in full side elevation, such surfaces not being seen at the righthand end of the screw for the reason that both the cage 34 and collar 38 at such end are shown in section. The collars 38 may be fixed to the shaft 10 in any suitable manner but preferably by some means which will permit the collars 38 to be secured to the screw 10 in axially adjusted position thereon to permit the amount of relative travel between the screw 10 and the nut 18 to be changed as desired. In Fig. 1 and as illustrated in connection with the righthand collar 38, a set screw 44 threaded radially of the collar 38 and seating in the groove 16 is illustrated as being provided for this purpose.

With the construction as last described let it be assumed, for instance, that the nut 18 is rotated in a direction to move the screw 10 to the right as viewed in Fig. 1, the screw 10 being held against rotation under such circumstances. As the nut 18 rotates and the screw 10 moves to the right eventually the stop surfaces 36 and 42 at the left hand end of the screw will contact one another at which time the cage 34 will be locked against further rotation with respect to the screw 10 in the direction in which the nut 18 is attempting to turn it and, therefore, the balls 32 will then be locked against movement in a corresponding direction in the groove 16 of the screw 10. This positively stops any further relative axial movement between the screw 10 and the nut 18 in the direction in which the nut 18 is tending to move it while rotating in the direction assumed, but if the nut 18 continues to rotate under such circumstances the balls 32 will simply slide or roll, or have a combined sliding and rolling effect, around their corresponding grooves 30 and this without imposing any undue additional load upon the driving motor. In fact under such circumstances the nut and screw are relatively freely rotatable.

If now the direction of the driving motor is reversed so as to cause the nut to be rotated in a direction opposite to that first assumed, the stop surfaces 36 and 42 at the lefthand end of the screw 10 will move away from each other, the balls 32 will roll in the grooves 16 as well as the grooves 30 and the screw 10 will be caused to move to the left as viewed in Fig. 1. This last movement will continue until the stop surfaces 36 and 42 at the righthand end of the screw become engaged with one another, at which time the balls 32 will be prevented from further movement in the grooves 16 in the corresponding direction and axial movement of the screw with respect to the nut will stop.

The fact that the balls 32 will not jam between the screw 10 and nut 18 under the above described circumstances, that is when the nut and screw have reached the limit of their relative movement in either direction, is important in two respects. First, the position where the relative axial movement between the nut and screw is stopped may be adjusted to occur within extremely narrow limits. Second, because of the fact that the nut and screw are relatively freely rotatable once they reach their relative limiting positions axially of the screw, it prevents any possibility of the balls jamming between the nut and the screw and makes it unnecessary to provide any electrical or mechanical brake to stop the relative rotation between the nut and the screw the moment the desired limiting position between them is reached. In this respect it will be understood that in conventional nut and screw constructions as well as in those constructions employing balls between the nut and the screw as heretofore suggested, as far as I am aware unless some means is provided for braking the motor when the nut and screw reach a relative limiting position axially of the screw the nut will overrun the screw, particularly when not under a sufficient load to quickly brake the motor upon breaking the circuit thereto, with the result that unless precautions are taken the screw or the nut, whichever is the movable element, may engage some fixed surface and the inertia of the motor causes the screw and the nut to be jammed together, often making it impossible for the power of the motor itself, upon reversal, to break the two loose from each other. Thus the device of the present invention obviates the necessity of providing a mechanical or electrical brake for the motor under any conditions and results in a construction that is not only extremely efficient in the transmission of power, but is economical to build as well.

In order to illustrate the importance of the last described advantage of the present invention it may be assumed that in the construction illustrated in Fig. 1 the members 14 secured to the end of the screw 10 are connected to one or more parts which it is desired to shift between two limits of movement. Under such circumstances the collars 38 are adjusted longitudinally of the screw 10 to a position permitting the required axial movement of the screw 10 to shift the connected part or parts through the required distance. In shifting the collars 38 it will, of course, be desirable, if not necessary, to so position the collars rotatably with respect to the screw 10 that a major portion of the cooperating stop surfaces 36 and 42 will contact each other upon engagement. Of course, where a set screw such as 44 is employed and which seats in the groove 16, this condition will automatically be realized if the parts are properly constructed in the first instance.

If desired, means may be provided to stop the motor 20—22 when the screw 10 has reached either of its limits of movement in the nut 18. While such means may be either manual or automatic, the latter will usually be preferred. One arrangement for obtaining this effect is shown as including a pair of switches, each generally indicated at S, and one mounted at each end of the housing 26. Each switch S may, as shown, comprise a member 50 carrying a contact 52 at its outer end and a cooperating flexible or resilient member 54 carrying a contact 56 at its outer end in opposed relation with respect to the corresponding contact 52. The member 54 may be supported at one end only and tensioned to urge its contact 56 into engagement with the opposed contact 52. Each member 54 is provided with an extended end portion 58 extending radially of the screw 10 and to a position in which it intersects the path of movement of the collar 38 at the corresponding end of the screw 10. The members 54 being axially inward of the corresponding member 50 with respect to the corresponding end of the screw, it will be appreciated that when the screw is moving either one way or the other the stop collar on the inwardly moving end of the screw will eventually engage the extended end portion of the corresponding switch S and separate the contacts 52 and 56 thereof. These switches S are so positioned that the stop collars 38 will engage the extensions 56 just before the corresponding stop surfaces 36 and 42 contact one another so as to insure that the switch S which is thus opened will be opened before the screw 10 is stopped from further axial movement in the nut 18.

The switches S are, of course, connected in series with a source of direct current indicated as a battery B. In the wiring diagram illustrated in Fig. 1, instead of including the armature 20 and field structure 22 of the electric motor above described directly in the wiring diagram, these parts are shown for the purpose of the wiring diagram in schematic form at 20a and 22a, respectively. In the particular wiring diagram it is assumed that the direction of current flowing through the armature 20a will be reversed in order to reverse the direction of rotation of the motor armature and, therefore, the nut 18.

The main control switch which is generally indicated at C will be seen to include a pair of fixed contacts E and F on one side thereof and three fixed contacts H, I and J on the other side thereof, and two manually or otherwise movable contacts K and L are insulated from each other and connected for simultaneous movement with each other. One side of the battery B and one side of the field structure 22a is grounded as indicated. The opposite side of the battery B is connected to the fixed contact E. The fixed contact F is connected to the ground through the field structure 22a. The fixed contact I is connected to the members 54 of both switches S through the armature 20a. The fixed contact H is connected to the member 50 of the righthand switch S and the fixed contact J is connected to the member 50 of the lefthand switch S.

When the movable contacts K and L are in the positions shown in Fig. 1, then the current from the battery B flows through the fixed contact E, movable contact L through the fixed contact H to the righthand switch S and if the latter is closed, as shown, then down through the armature 20a to the fixed contact I and through the movable contact K and fixed contact F through the field structure 22a to the ground G. The current in such case cannot flow through the lefthand switch S as the fixed contact J is in open circuit at such time. It may be assumed that under such conditions and as shown the armature 20 of the motor is rotating in a direction to move the screw 10 to the left, in other words in a counterclockwise direction of rotation as viewed from the righthand end of the screw 10. Under such circumstances as soon as the righthand stop collar 38 strikes the extension 58 of the switch member 54 for the righthand switch S the contacts 52 and 56 of such switch will be opened, thus breaking the circuit to the motor and causing the motor to be de-energized. It will be understood that under such circumstances shortly after the collar 38 engages the extension 58 of the righthand switch S and opens the switch far enough to break the circuit through it to the stop surface 42 of the collar 38 at the righthand end of the screw 10 will engage the stop surface 36 of the cage 34 at the corresponding end of the screw and prevent further relative axial movement between the screw and the nut 18 regardless of whether the armature 20 continues to rotate under the effect of its inertia.

Under the last assumed conditions the switch S at the righthand end of the screw 10 is opened, while the switch S at the lefthand end of the screw is closed. If the control switch C is now moved to move the movable contacts L and K thereof downwardly from the position shown so as to break the circuit between the fixed contacts E and H and cause the movable contact L to bridge the fixed contacts E and I and the movable contact K to bridge the fixed contacts F and J, the current from the battery B will flow from the fixed contact E through the movable contact L to the fixed contact I, from the latter through the armature 20a in the opposite direction from that first described, then through the lefthand switch S, then between the fixed contact J and F through the movable contact K, and thence through the field structure 22a to the ground G. In thus reversing the flow of current through the armature 20a the direction of rotation of the armature and consequently the nut 18 will be reversed from that first described and will cause the screw 10 to travel to the right as viewed in Fig. 1. As soon as the stop collar 40 at the righthand end of the screw 10 moves away from the corresponding switch S such switch S will close, but inasmuch as the fixed contact G is now out of the circuit it will simply act to position the righthand switch S for operation when the direction of rotation of the motor is next reversed. The screw 10 under the last described conditions will, of course, continue to move to the right until the lefthand stop collar 38 engages the lefthand switch S and breaks the circuit through the motor and which will occur, as previously described, shortly before the stop surfaces 42 and 36 at the lefthand end of the device engage each other to positively limit further movement of the screw 10 in the described direction without limiting rotation thereof.

Thus through the control switch C the direction of movement of the nut 18 and consequently the direction of travel of the screw 10 may be readily controlled, and the current to the motor will be broken when the screw 10 substantially reaches its desired position of translation in either axial direction. When such position of translation of the screw is reached the particular pair of stop surfaces 36 and 42 operative at such limit will engage each other to positively limit further axial movement of the screw without restricting continued rotation of the motor under inertia effects and will positively eliminate the possibility of jamming of the balls 32 between the screw 10 and nut 18 without the use of either electrical or mechanical braking means for the motor. The advantages of the present invention will thus be appreciated.

Figure 2:
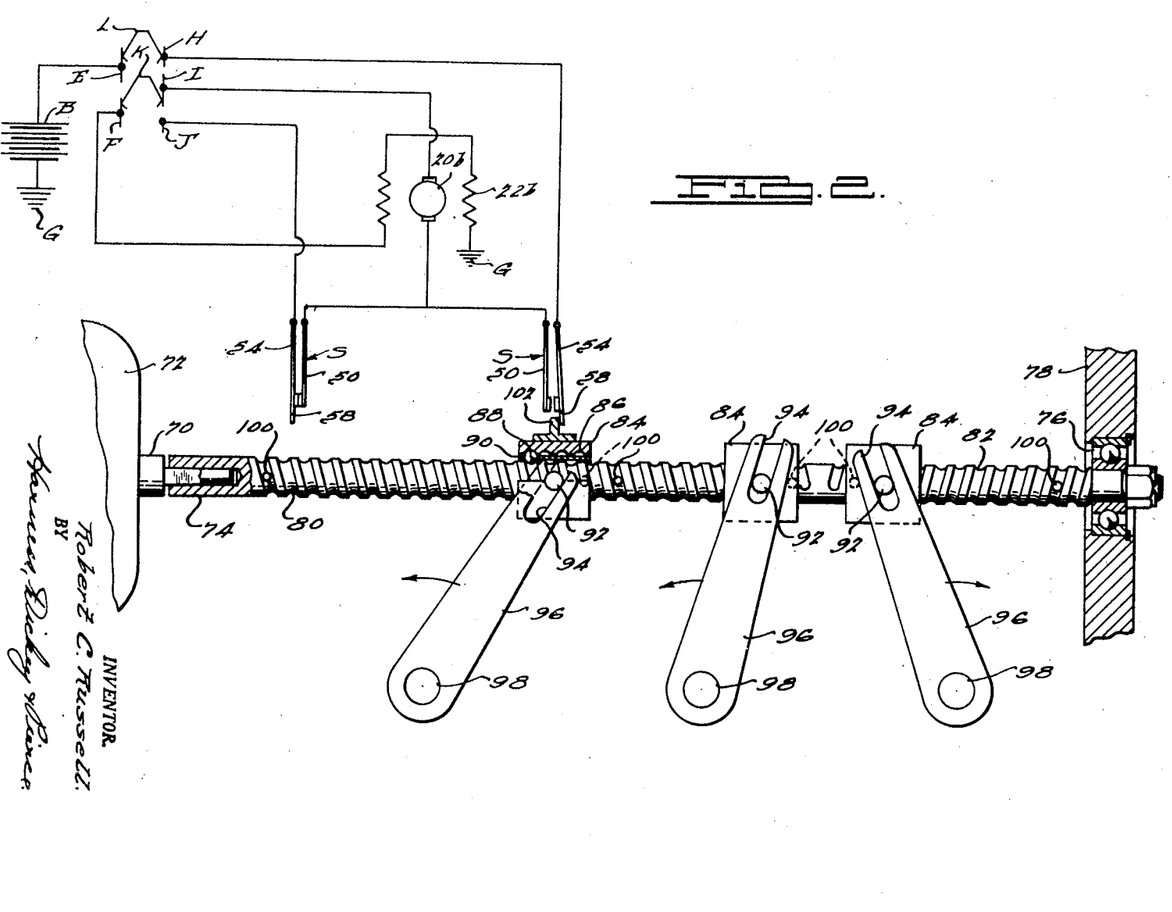
Fig. 2 is a partially broken, partially sectioned view of a form of the device of the present invention in which the screw is rotated by a reversible electric motor and is held against axial movement, and the nut is held against rotation but permitted to travel along the screw, and also showing the wiring diagram for the circuit controlling the electric motor; and, Fig. 3 is a fragmentary view showing an application of the present invention to a construction for controlling the position of a longitudinally movable power element in either direction in "step-by-step" or in "follow-up" relation, also showing the wiring diagram for the reversible electric driving motor.
Figure 7:
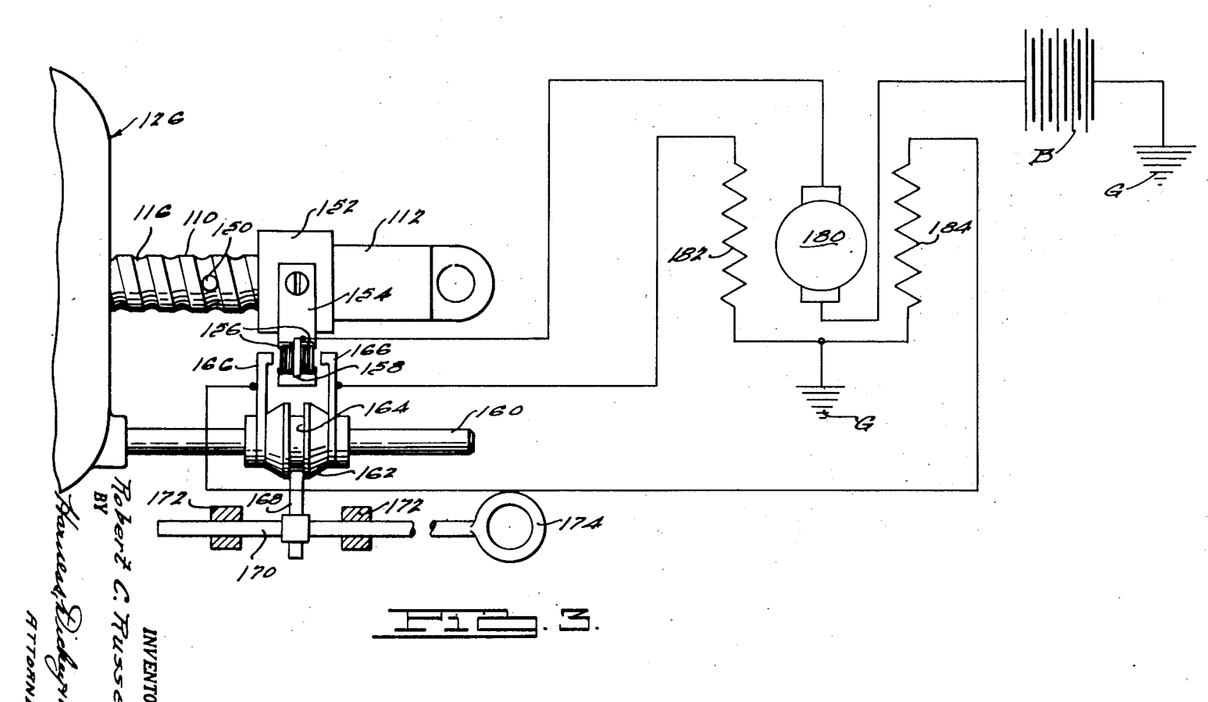

In the arrangement illustrated in Fig. 2 the shaft 70 of a reversible electric motor 72 is fixed directly and concentrically to one end of a screw member 74 the opposite end of which may be supported in any suitable manner such as by means of an anti-friction bearing assembly 76 carried by a support such as 78. In this particular case the screw member 74 is provided with a righthand helical groove 80 therein, corresponding to the groove 16 of the first-described screw, and extending from a point adjacent its lefthand end to a point beyond its center, and a second and in this case lefthand helical groove 82 therein corresponding to the groove 16 in the first-described construction extending from adjacent the righthand end thereof to a point adjacent the corresponding end of the groove 80. The screw member 74 in the particular case shown is held against axial movement and has mounted thereon three identical nut members 84, two of which are mounted for cooperation with the groove 80 and one of which is mounted for cooperation with the groove 82. Each nut member 84 is provided with a plurality of axially spaced circumferentially extending grooves 86 corresponding with the grooves 30 of the first-described construction and one ball 88 is positioned between each groove 86 and the corresponding groove 80 and 82. A cage member 90, corresponding with the cage member 34 of the first-described construction, is interposed between the screw member 74 and each nut 84 for maintaining the various balls 88 in each nut 84 in proper relation with respect to each other.

In the particular construction shown in Fig. 2 each nut member 84 is provided with a pair of diametrically disposed pins 92 fixed thereto and projecting from opposite sides thereof and the pins of each nut member 84 are received within slots 94 formed in the outer yoke ends of the corresponding levers 96. Each lever 96 is fixed to the end of a rotatably mounted shaft 98 and it is assumed that each shaft 98 is fixed to some corresponding part or member required to be operated thereby.

It will be understood from the above that when the screw member 74 is rotated in one direction of rotation the lefthand nut member 84 and the middle nut member 84 will be caused to move axially along the screw member 74 in the same direction, while the righthand nut 84 will be caused to move along the screw member 74 in a direction opposite to the direction of the two first-mentioned nuts.

The construction illustrated in Fig. 2 brings out the fact that a plurality of nuts may thus be mounted upon a screw in a device constructed in accordance with the present invention and each nut may be caused to move axially along the screw a distance different from each of the other nuts, this being an effect which is absolutely impossible in similar constructions heretofore described as far as I am aware. It will be appreciated that the provision of a nut and screw construction wherein several nuts are movable on the screw simultaneously but each for a different distance is possible only because of the fact that in accordance with the present invention the travel of the nut on the screw may be stopped without necessitating the stoppage of the relative rotation between the nut and screw.

In the construction illustrated in Fig. 2 instead of providing collar members such as the collar members 38 of the first-described construction on the screw for engagement with the ball cages, the movement of the balls in the grooves 80 and 82 is limited by means of pins 100. The pins 100 are secured in the screw members 74 centrally of the corresponding groove 80 or 82 thereof and project into the groove only far enough to engage the endmost ball 88 on the same side of the corresponding nut 84 when such nut is moved in its direction. It will be appreciated in such case that when the leading ball 88 of any nut 84 strikes a pin 100 the pin stops further travel of the ball in the groove, and such ball acting through its corresponding cage 90 similarly stops the movement of all other balls 88 of the same nut 84 in the grooves 80 or 82 of the screw member 74. However, relative rotation between the screw and the nut may continue after a ball has struck a stop pin 100 because of the fact that such time the balls of the same nut are still free to roll around in the grooves 86 of such nut.

In the particular arrangement of parts shown in Fig. 2 the pins 100 which serve to limit the axial movement of the lefthand nut 84 are spaced from each other axially of the screw member 74 by the greatest distance, the pins 100 serving to limit the axial movement of the middle nut 84 on the screw member 74 are spaced from each other axially of the screw member 74 by the shortest distance, and the pins 100 in the groove 82 which limit the travel of the righthand nut member 84 on the screw member 74 are spaced from each other by an intermediate distance. Thus assuming the relation of the various nuts 84 and screw members 74 to be that shown in Fig. 2 and assuming that the shaft 70 of the motor 72 is put into operation in a counterclockwise direction of operation as viewed from the righthand end of the screw member 74, the two lefthand nuts 84 will move to the left on the screw member 74 and the righthand nut 84 will move to the right thereon. Because of the described spacing of the stop pins for the various nuts it will be appreciated that the nut 84 will reach its lefthand stop pin 100 before either of the other nuts 84 reach a position of movement on the screw member 74 to engage their corresponding stop pins. Consequently if rotation of the screw member 74 is continued after the center nut 84 has reached the limit of its travel to the left it will remain at the lefthand limit of its movable position and subsequently the righthand nut 84 will be stopped by its righthand stop pin 100, after which and upon continued rotation of the screw member 74 the lefthand nut member 84 will eventually be stopped from axial movement on the screw member 74 through the action of its lefthand stop pin 100, at which time all nut members 84 will be located at one limit of their movable position and will remain there although the screw member 74 continues to rotate. Reversal of the direction of rotation of the shaft 70 of the motor 72 will operate in a corresponding manner to return all the nut members 84 to the positions indicated in full lines in Fig. 2.

In event it is desired to automatically stop rotation of the electric motor 72 when all the nut members 84 have reached their limiting position in either direction on the screw member 74, then the same switches S as used in the first-described construction and electrically connected to the electric motor in identically the same way as first-described may be employed and for this reason the wiring diagram illustrated in Fig. 2 requires no explanation other than to note that the armature for the electric motor is diagrammatically illustrated at 20b and the field structure therefor at 22b. In such case the nut member having the longest travel on the screw member 74, namely the lefthand nut member 84 in the construction shown, has fixed thereto an upstanding finger 102 and the switches S are so positioned that the projecting ends 58 thereof will be engaged by the finger 102 at the corresponding ends of the stroke of the nut 84 to separate the contacts thereof in identically the same manner as described in connection with the structure shown in Fig. 1.

In Fig. 3 a construction is shown in which an electric motor indicated generally at 126 and which may be identical to the electric motor of the first-described construction is employed. The screw 110 may be identical to the screw 10 of the first-described construction and provided with a helical groove 116 identical to the groove 16 of the first-described construction. The shaft of the motor 26 (not shown) will be understood to be hollow so as to serve as a nut and will be connected to the screw 110 in identically the same manner as shown and described in connection Fig. 1. The screw 110 is provided with an eye member 112 secured to its free end and which eye member may be identical to the eye member 12 in the first-described construction and similarly adapted for attachment to a clevis or the like. Instead of employing collar member such as the collar members 38 of the first-described construction for limiting movement of the screw 110 in its motor shaft nut, in this case pins 150, of the same character as the pins 100 shown in connection with Fig. 2 are employed.

In the construction illustrated in Fig. 3 it is assumed that it is desired to be able to control the axial position of the screw 110 at any point between its opposite limits of movement and to accomplish this a collar member 52 fixed to the screw 110 is provided with a downwardly projecting bracket 154 which carries at its lower end a pair of contacts 156 mounted on axially opposite sides of a conductor member 158 suitably insulated from the screw 110. The contacts 156 are each of the carbon pile type, or the equivalent, the conductivity of which varies in accordance with the compressive force applied thereto.

Below the screw 110 a cylindrical rod 160 is fixed at one end to the housing for the motor 126 in parallel relation with respect to the axis of the screw 110. The rod 160 slidably receives thereon a member 162 centrally grooved as at 164 and at each of its opposite ends supports a contact member 166 insulated therefrom and from each other. The contact members 166 are spaced from one another by a distance slightly greater than the axial distance between the axially outer faces of the contacts 156. The position of the member 162 on the rod 160 is controlled by means of a yoke or finger 168 engaged in the slot 164 thereof. The yoke or finger 168 is fixed to a rod 170 slidably supported for axial movement in parallelism to the rod 160 by means of suitable bearings 172. The position of the rod 170 may be manually or otherwise controlled, it being shown with an eye 174 for manual control in the particular construction shown.

As indicated in the wiring diagram in Fig. 3 the motor 126 in this case includes an armature 180 through which the current flows in the same direction at all times, and a field structure including parallel windings 182 and 184 reversed in direction from each other. The current from the battery B flows through the armature 108 and thence to the conductor 158 and to the contacts 156 carried by the screw 110. One of the contacts 166 is electrically connected through the field winding 182 with the ground and the other contact 166 is electrically connected through the remaining field winding 184 with the ground. When the member 162 is in the position shown in Fig. 3, or an equivalent position in which the contacts 166 are both spaced from the contacts 156, then the current through the motor is broken and the motor stationary. If either of the contacts 156 are brought into contact with their corresponding contacts 156 through movement of the rod 170, then the motor is energized and will rotate in a direction depending upon whether it is energized through the winding 182 or the winding 184. The speed of the motor will depend upon the pressure applied to the contacts 156 through the control rod 170 inasmuch as the contacts 156 are of the carbon pile type as previously explained. In practice the arrangement is such that when the control rod 170 is moved to the left as viewed in Fig. 3 to bring the righthand contact 166 into engagement with the righthand contact 156, thereby to energize the winding 182, the motor 126 will be rotated in a direction to cause the screw 110 to move to the left as viewed in Fig. 3. Obviously, if the rod 170 is moved as above assumed and after contact is made between the contacts 156 and 166 no further movement is imparted to the rod 170, the motor 126 will be operated just sufficiently to break the contact thus established and the motor will immediately stop when such contact is broken. If, however, continued pressure to the left is applied to the rod 170, then contact between the righthand contacts 156 and 166 will continue once the motor is energized and the screw 110 will be drawn to the left to the full extent of its movement as governed by the position of the righthand stop pin 150. On the other hand, if the control rod 170 is moved to the right as viewed in Fig. 3 to cause engagement between the lefthand contacts 156 and 166, then the motor 126 will be rotated in a direction opposite to that above described and will cause the member 110 to be moved to the right as viewed in Fig. 3 and continuance of such movement will depend upon whether a continuance of the pressure applied to the rod 70 to the right is continued or is interrupted and the screw 110 will be moved accordingly until its lefthand pin 150 limits further movement of the balls in the groove 116 as will be appreciated.

It will thus be understood that with the construction illustrated in Fig. 3 movement of the screw 110 in either direction may be controlled in either step-by-step or in follow-up relation between the limits of movement of the screw 110 as determined by the pins 150 thereon.

Many other applications of the present invention will be apparent to those skilled in the art, it being understood that the applications of the invention shown in the drawings are by way of illustration and not by way of limitation.

Having thus described my invention, what I claim by Letters Patent is:

1. A mechanical movement comprising, in combination, a screw member having a concentric helical groove in the peripheral surface thereof, a nut member having a bore therein in which said screw member is received, said nut member having a concentric circumferentially continuous annular groove in the bore thereof, a ball simultaneously received in both of said grooves and serving to operatively interconnect said screw member and said nut member, and a pair of means carried by said screw member spaced axially of said screw member from each other by a distance materially in excess of the diameter of said ball and operative to limit the movement of said ball in said groove of said screw member beyond predetermined positions axially of said screw member, said ball being always free to move about the axis of said nut member in said groove in said nut member.

2. A mechanical movement comprising, in combination, a screw member having a concentric helical groove in the peripheral surface thereof, a nut member having a bore therein receiving said screw member, said nut member having a plurality of axially spaced concentric circumferentially extending and continuous annular grooves in the bore thereof, a ball seating in each of said grooves of said nut and simultaneously seating in said groove of said screw member, means mounting said ball for rotation with respect to said nut member and said screw member, and means fixed with respect to said screw member and cooperating with the first mentioned means operative to limit movement of said balls in said groove of said screw member only axially of said screw member beyond predetermined positions thereon.

3. A mechanical movement comprising, in combination, a screw member having a concentric helical groove in the peripheral surface thereof, a nut member having a bore therein receiving said screw member, said nut member having a plurality of axially spaced concentric circumferentially extending and continuous annular grooves in the bore thereof, a ball seating in each of said grooves of said nut and simultaneously seating in said groove of said screw member, a cage member interposed between said screw and nut maintaining said balls in predetermined relation with respect to each other, and means including said cage and means fixed with respect to said screw member operative to limit movement of said balls in said groove of said screw member only axially of said screw member beyond predetermined positions thereon.

4. A mechanical movement comprising, in combination, relatively rotatable screw and nut members, said screw member having a concentric helical groove in the periphery thereof, said nut member having a plurality of axially spaced circumferentially extending concentric annular grooves in the bore thereof, a ball seating in each of the last-mentioned grooves and simultaneously seating in said groove of said screw member serving to operatively interconnect said screw and nut members, a cage interposed between said screw and nut members operatively engaging said balls and serving to maintain said balls in predetermined relation with respect to each other angularly about the axes of said members, and means fixed with respect to said screw member engageable with said cage and operative to limit the travel of said balls in said groove of said screw member between predetermined positions in the length of said screw member and without restricting movement of said balls in said grooves of said nut member.

5. A mechanical movement comprising, in combination, relatively rotatable screw and nut members, said screw member having a concentric helical groove in the periphery thereof, said nut member having a plurality of axially spaced circumferentially extending concentric annular grooves in the bore thereof, a ball seating in each of the last-mentioned grooves and simultaneously seating in said groove of said screw member serving to operatively interconnect said screw and nut members, a cage interposed between said screw and nut members operatively engaging said balls and serving to maintain said balls in predetermined relation with respect to each other angularly about the axes of said members, the opposite ends of said cage each being formed to present a generally axially directed stop face, and means stationary with respect to said screw member at opposite ends of said nut member arranged for contact with the corresponding of said stop faces when said nut member reaches a predetermined position of relative axial movement with respect to said screw member in either direction whereby to limit travel of said balls in said groove of said screw member while permitting said balls to continue to move freely in said grooves of said nut member.

6. A mechanical movement comprising, in combination, relatively rotatable screw and nut members, said screw member having a concentric helical groove in the periphery thereof, said nut member having a plurality of axially spaced circumferentially extending concentric annular grooves in the bore thereof, a ball seating in each of the last-mentioned grooves and simultaneously seating in said groove of said screw member serving to operatively interconnect said screw and nut members, a cage interposed between said screw and nut members operatively engaging said balls and serving to maintain said balls in predetermined relation with respect to each other angularly about the axes of said members, the opposite ends of said cage each being formed to present a generally axially directed stop face, means mounted upon said screw member at opposite ends of said nut member each providing a generally axially directed stop face arranged for opposed contacting relationship with respect to the corresponding of said stop faces of said cage upon a predetermined relative travel of said nut member with respect to said screw member in a corresponding direction, thereby to limit further movement of said balls in said groove of said screw member in a corresponding direction without limiting movement of said balls in said grooves of said nut member.

7. A mechanical movement comprising, in combination, a screw member and an encompassing nut member, said screw member having a concentric helical groove in the periphery thereof and said nut member having a plurality of axially spaced concentric annular grooves in the bore thereof, a ball received in each of the last-mentioned grooves and simultaneously received in the first-mentioned groove serving to mechanically interconnect said screw and nut member, a cage interposed between said screw and nut members operatively engaging said balls and serving to maintain said balls in predetermined angular relationship with respect to each other about the axes of said members, each end of said cage being formed to provide an approximately axially parallel stop face exposed in the direction of extension of said groove in said screw member therefrom toward the corresponding end of said screw member, a member secured to said screw member on each side of said nut member and adjustable thereon axially of said screw member, each of the third-mentioned members being formed to provide a generally axially parallel stop face facing in the direction of travel of said groove in said screw member therefrom toward the said nut member, said stop faces at each end of said cage each being arranged for substantially flat contacting engagement with the stop face of the third-mentioned member on the corresponding end of said screw member upon said nut member reaching a predetermined relative position on said screw member, contact of corresponding of said stop faces on said cage and said third-mentioned members serving to limit further movement of said balls in said groove of said screw member without limiting further movement of said balls in said grooves of said nut member.

8. In combination, a screw member having a concentric helical groove in the periphery thereof, a nut member surrounding said screw member and having a concentric annular groove in the bore thereof, a ball received simultaneously in both of said grooves and serving to mechanically interconnect said members whereby rotation of one of said members only effects relative axial movement between them, means mounting said ball and cooperating between said ball and said screw member limiting movement of said ball in said groove of said screw member between predetermined points spaced axially of said screw member, a reversible electric motor operatively connected with one of said members to effect rotation thereof, a pair of switches in the circuit to said motor, said switches being spaced from each other axially of said screw member, and means cooperating between the axially movable one of said members and said switches operative to open said circuit through said switch members immediately prior to said means becoming effective to stop travel of said balls in said groove of said screw member in either direction of movement of said balls therein.

9. In combination, a screw having a concentric helical groove therein, a pair of nuts embracing said screw member in axially spaced relation with respect to each other, each of said nuts having concentric annular groove means in the bore thereof, ball means interposed between the groove means of each of said nuts and said groove of said screw and serving to mechanically interconnect said nuts and screw, means mounting said ball means and cooperating between said screw and said balls means for one of said nuts operative to limit the movement of said ball means for said one of said nuts in said groove of said screw between predetermined axial positions on said screw, means cooperating between said ball means for the other of said nuts and said screw operative to limit movement of said ball means for said other of said nuts in said groove between predetermined axial positions on said screw spaced from each other axially of said screw by a distance different than said means limiting movement of said ball means for said one of said nuts thereon, said ball means always being freely movable in said grooves of said nuts whereby continued relative rotation between said screw and said nuts after one of said nuts has reached a limiting position relative to said screw member permits continued relative rotation between said nuts and screw member to cause the other of said nuts to travel to its corresponding limiting position on said screw.

10. In combination, a screw member having a concentric helical groove in the periphery thereof, a nut member surrounding said screw and having a concentric annular groove in the bore thereof, a ball received simultaneously in both of said grooves serving to mechanically interconnect said members whereby rotation of one of said members only effects relative axial movement between them, a reversible electric motor operatively connected with one of said members to effect rotation thereof whereby to cause axial movement of the other of said members, a pair of contacts carried by said other of said members and movable axially therewith, a second pair of contacts mounted for axial movement in parallel and follow-up relation with respect to axial movement of said axially movable member and mounted for selective engagement with the first-mentioned pair of contacts, all of said contacts being in circuit with said electric motor whereby to control the energization and direction of rotation of the latter, and means mounting said ball and cooperating between said ball and said screw so constructed and arranged as to limit relative axial movement without limiting relative rotation between said members regardless of the circuit established through said motor by said contacts.

ROBERT C. RUSSELL.

REFERENCES CITED

The following references are of record in the file of this patent:

UNITED STATES PATENTS

| Number | Name | Date |
| --- | --- | --- |
| 111,923 | Findlay et al. | Feb. 21, 1871 |
| 2,327,013 | Briggs et al. | Aug. 17, 1943 |
| 2,375,422 | Leland | May 8, 1945 |

FOREIGN PATENTS

| Number | Country | Date |
| --- | --- | --- |
| 130,529 | Great Britain | Aug. 7, 1919 |